United States Patent [19]
Lindbert

[11] 3,792,898
[45] Feb. 19, 1974

[54] MULTI-POSITION SEAT BACK ADJUSTER AND LATCH

[75] Inventor: Brook A. Lindbert, Utica, Mich.

[73] Assignee: General Motors Corporation, Detroit, Mich.

[22] Filed: Oct. 18, 1972

[21] Appl. No.: 298,627

[52] U.S. Cl. .............................. 297/355, 297/379
[51] Int. Cl. .............................................. B60n 1/06
[58] Field of Search ..... 297/355, 367, 370, 379, 29, 297/354, 358, 378

[56] References Cited
UNITED STATES PATENTS

| 3,275,372 | 9/1966 | Radke et al. | 297/285 |
| 3,342,527 | 9/1967 | Bencene | 297/379 |

FOREIGN PATENTS OR APPLICATIONS

| 1,288,793 | 0/1962 | France | 297/379 |
| 587,972 | 0/1959 | Italy | 297/355 |

*Primary Examiner*—Bobby R. Gay
*Assistant Examiner*—William E. Lyddane
*Attorney, Agent, or Firm*—Herbert Furman

[57] ABSTRACT

A conventional vehicle seat includes a seat back having laterally spaced support arms pivoted to the seat frame for pivotable movement of the seat back. A spring biased latch lever is pivotally attached to the outboard support arm and engages a pin on the seat frame to lock the seat back. An adjuster cam has a plurality of discrete cam surfaces and is pivotally mounted on the seat frame for rotary movement to a position wherein a selected one of the cam surfaces engages the underside of the support arm to define the angular use position of the seat back relative the frame. An unlatching cam is attached to the adjuster cam for rotation therewith and has a pair of lobes located circumferentially past the plurality of the cam surfaces of the adjuster cam so as to be engageable with and disengage the latch lever from the pin on the seat frame upon rotation of the cams in either direction past the engagement of the discrete cam surfaces with the support arm to permit movement of the seat back to a forward easy-enter position.

3 Claims, 6 Drawing Figures

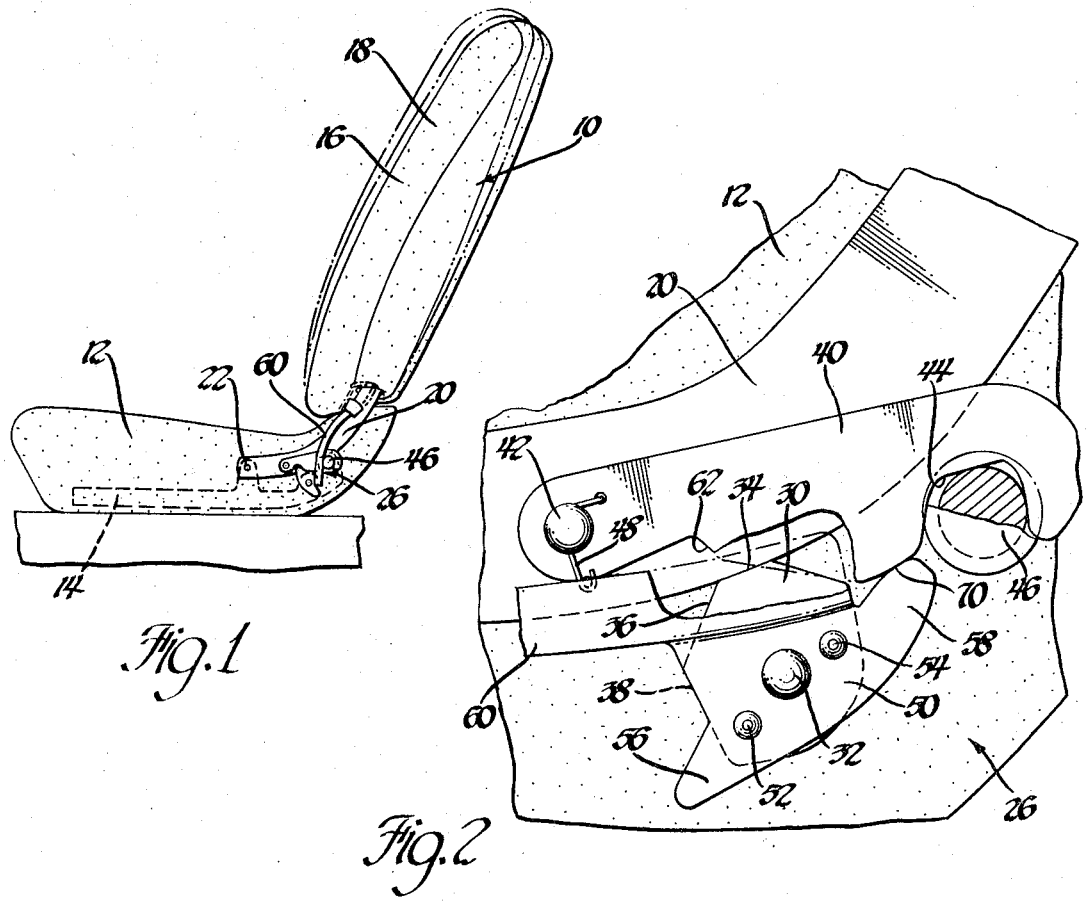
Fig.1
Fig.2
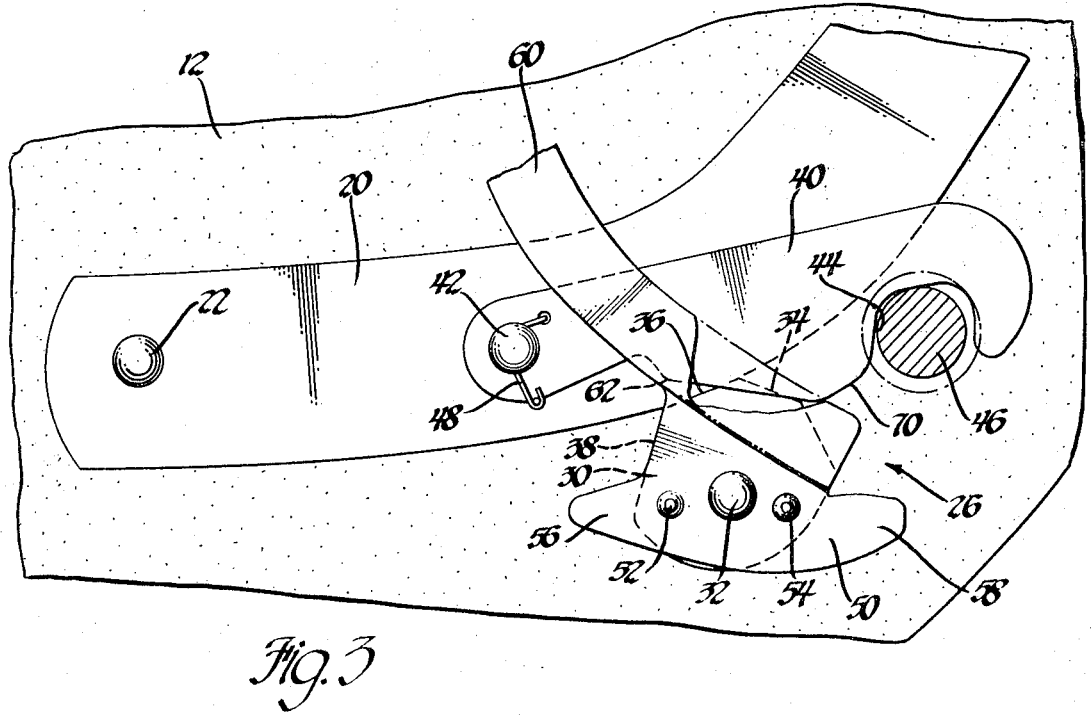
Fig.3

MULTI-POSITION SEAT BACK ADJUSTER AND LATCH

The invention relates to a vehicle seat and more particularly to a multi-position angle adjuster and latch for a vehicle seat back.

It is known to provide a vehicle seat having a pivoted seat back which is adjustable to be disposed in different angular use positions relative to the vertical. It is also known to provide a vehicle seat having a pivoted seat back and a latch assembly which locks the seat back in its use position and is operable to release the seat back for forward pivotal movement to an easy-enter position facilitating access to the rear seat. Furthermore, it is known to provide a vehicle seat having a seat back pivotally supported at its lower portion by an angle adjuster and pivotally supported at an upper portion by a seat back latch.

The invention provides an improved multi-position seat back adjuster and latch for a conventional seat back having laterally spaced support arms pivoted to the seat frame for pivotal movement between a plurality of angular use positions and a forwardly tilted position giving ease of ingress and egress from the rear seat. According to the invention, an adjuster cam has a plurality of discrete cam surfaces and is pivotally mounted to the seat frame for rotary movement to a position wherein a selected one of the plurality of discrete cam surfaces engages the support arm to support the seat back in various angular use positions relative the seat frame. A latch lever is pivotally attached to the support arm on the outboard face thereof and has an elongated recess which is engageable on a pin mounted on the seat frame to lock the seat back from pivotal movement forward of the forwardmost use position. An unlatching cam is attached to the adjuster cam on the outboard face thereof and has first and second cam lobes which are located circumferentially past the plurality of discrete cam surfaces of the adjuster cam. An operating handle is attached to the unlatching cam to permit unitary rotation of the adjuster and unlatching cams. Upon rotation of the cams in either direction past the engagement of the discrete cam surfaces of the adjuster cam with the support arm the lobes of the unlatching cam engage and lift the latch lever against the bias of the spring to permit forward pivotal movement of the seat back to the easy-enter position.

One feature of the invention is the provision of a multi-position seat back adjuster and latch mechanism operable by a single control handle.

Another feature of the invention is a seat back adjuster and latch having a pair of side-by-side cams, one of which operates within a predetermined range of rotary movement to adjust the seat back angle and the other of which operates upon movement of the cams in either direction past the predetermined range to unlatch the seat back for movement to the easy-enter position.

These and other features, objects and advantages of the invention will become apparent upon consideration of the specification and the appended drawings in which:

FIG. 1 is a side elevation view of a conventional vehicle seat embodying the invention:

FIG. 2 is a side elevation view of the multi-position seat back adjuster and latch having parts broken away and in section and shown in position defining the forwardmost use position of the seat back;

FIGS. 3 and 4 are views similar to FIG. 2 respectively showing the device in position providing intermediate and rearwardmost angular use positions of the seat back.

Figure 4:
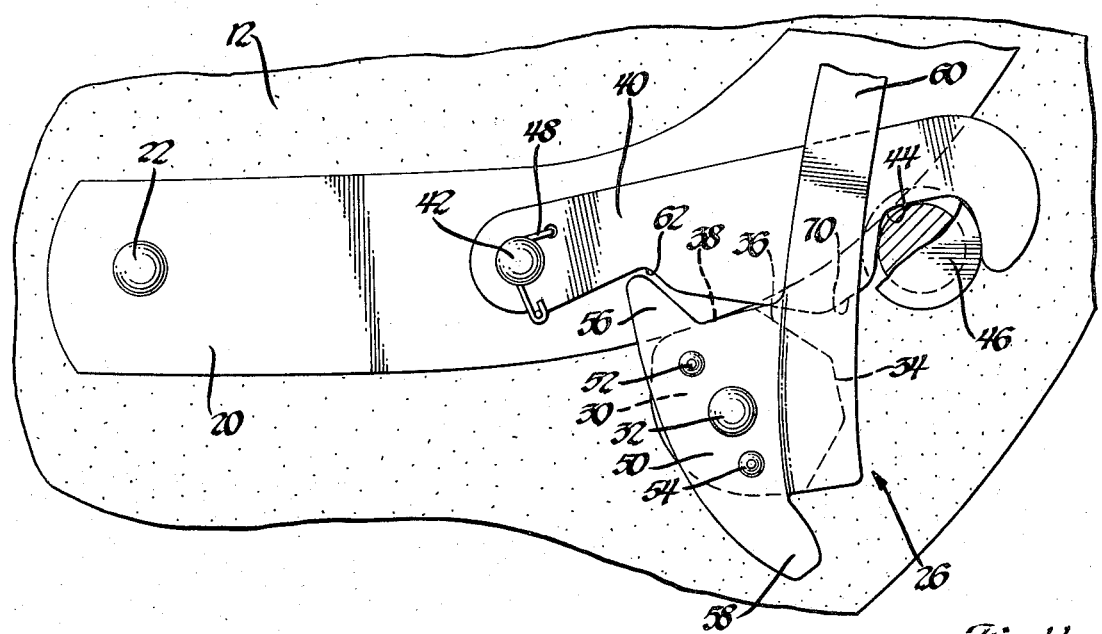

Referring now to FIG. 1, the conventional vehicle front seat generally indicated as 10 includes a seat cushion 12 having a conventional frame 14 which is in turn mounted to the floor a motor vehicle by a conventional seat adjusting assembly now shown. The vehicle seat 10 also includes a seat back 16 including a back cushion 18 mounted on an outboard J-shaped support arm 20 and a like inboard J-shaped support arm not shown in the drawing. The outboard support arm 20 is attached to the seat frame 14 by a pivot 22 and the inboard support arm is pivotally attached to the frame 14 by a like pivot to permit pivotal movement of the seat back 16 between the full line and phantom line use positions of FIG. 1 and a forwardly tilted easy-enter position not shown, permitting ease of occupant entry to and egress from the rear seat of the vehicle.

Referring to FIGS. 1 and 2, the multi-position angle adjuster and latch mechanism indicated generally at 26 selectively defines the angle of the seat back 16 when in use position and selectively unlatches the seat back 16 for forward pivotal movement to easy-enter position. As best seen in FIG. 2, the angle adjuster includes an adjuster cam 30 which is mounted on the seat frame 14 by a pivot 32. The adjuster cam 30 has a plurality of discrete cam surfaces 34, 36 and 38 which are selectively engageable with the underside of outboard support arm 20 upon rotation about pivot 32 to define the angular use position of the seat back 16 relative the seat cushion 12. FIG. 2 shows the adjacent cam 30 in a rotary position wherein the highest cam surface 34 engages the underside of support arm 20 to define the fowardmost use position of the seat back 16; FIG. 3 shows the angle adjuster 30 in rotary position wherein a cam surface 36 of intermediate height engages the support arm 20 to hold the seat back in an intermediate angular use position; and FIG. 4 shows the adjuster cam 30 in rotary position wherein the cam surface 38 of the lowest height engages support arm 20 to support the seat back 16 in its rearwardmost angular use position as shown in solid lines in FIG. 1.

A latch mechanism locks the seat back in the use position thereof as defined by the angle adjuster cam 30. A latch lever 40 is pivotally mounted on the outboard face of the outboard support arm 20 by a pivot 42. Latch lever 40 includes an elongated recess 44 which receives and captures a headed pin 46 mounted on the seat frame 14 to lock the seat back 16 from forward pivotal movement past its forwardmost use position as seen in FIG. 1. A spring 48 acts between latch lever 40 and support arm 20 and biases the latch lever 40 into engagement of the pin 46. An unlatching cam 50 is juxtaposed to the adjuster cam 30 on the outboard face thereof and is conventionally attached thereto as by rivets 52 and 54 for rotation therewith about pivot 32. The unlatching cam 50 includes cam lobes 56 and 58 which are disposed at an angle generally greater than the angle through which the discrete cam surfaces of the adjuster angle 30 are disposed. An operating handle 60 is formed integrally with the unlatching cam 50 to facilitate rotation of the unlatching cam 50 and adjuster cam 30.

Figure 5:
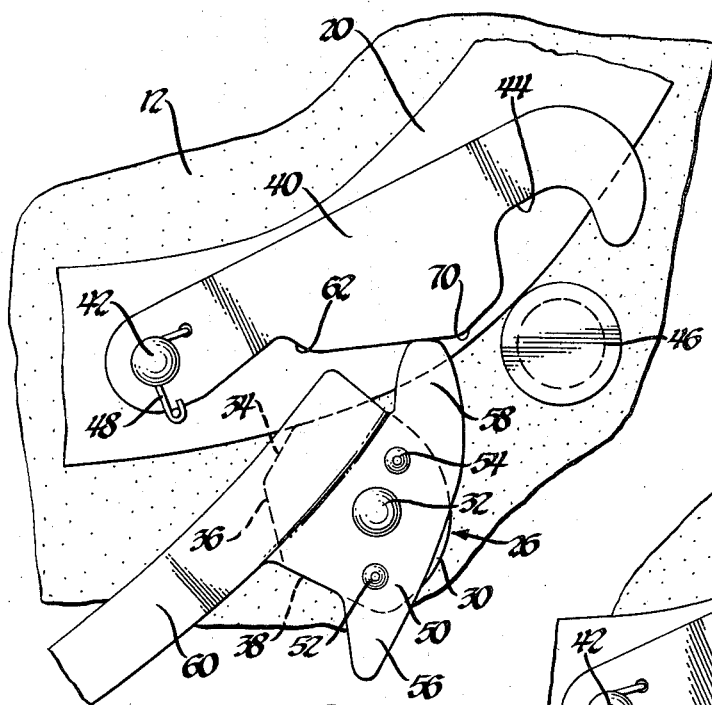
FIGS. 5 and 6 are side elevation views of the invention shown in positions unlatching the seat back for forward pivotal movement to easy-enter position.
Figure 6:
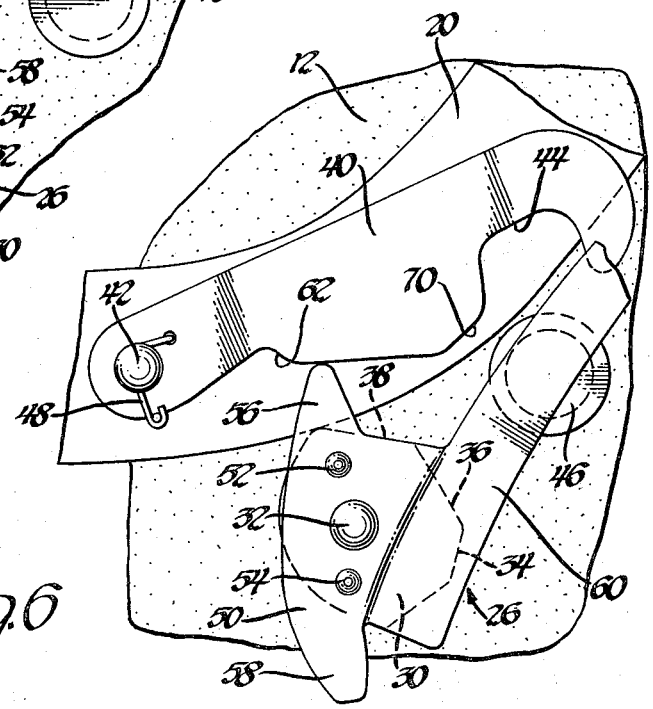

As seen in FIG. 5, upon rotation of the adjuster cam 30 past the point of engagement of its cam surface 34 with the support arm 20, the lobe 58 of unlatching cam 50 rides up a cam follower surface 70 of latch lever 40 to lift the latch lever 40 against the bias of spring 48 and out of engagement with the headed pin 46 so that the seat back 16 may be moved forwardly to easy-enter position. Similarly, as seen in FIG. 6, upon rotation of the adjuster cam 30 past the point of engagement of cam surface 38 thereof with the support arm 20, the lobe 56 of unlatching cam 50 rides up a cam follower surface 62 of latch lever 40 to lift the latch lever 40 against the bias of spring 48 and out of engagement with the headed pin 46.

Thus, there is provided an improved multi-position seat back adjuster and latch.

I claim:

1. In a vehicle seat including a seat back having laterally spaced support arms pivoted to the seat frame for pivotal movement of the seat back between use and easy-enter positions, the improvement comprising, a latch lever pivotally mounted on one of the support arms, means on the seat frame engageable by the latch lever to lock the seat back, spring means biasing the latch lever into engagement of the means on the seat frame, first and second cam means pivotally mounted on the seat frame for unitary rotation, one of the cams means engaging the one support arm and being effective upon rotation thereof through a predetermined range of rotation to vary the use angle of the seat back relative the frame, the other of the cam means being effective upon rotation of the one cam means past its predetermined degree of seat back angle positioning to disengage the latch lever from the means on the seat frame to permit forward pivotal movement of the seat back to easy-enter position.

2. In a vehicle seat including a seat back having laterally spaced support arms pivoted to the seat frame for pivotal movement of the seat back between use and easy-enter positions, the improvement comprising: a latch lever pivotally attached to one of the support arms, means on the seat frame engageable by the latch lever to lock the seat back, spring means biasing the latch lever into engagement of the means on the seat frame, an adjuster cam having a plurality of discrete cam surfaces, pivot means mounting the adjuster cam on the seat frame for movement to a position wherein a selected one of the plurality of discrete cam surfaces engages the support arm to the defined angular use position of the seat back relative the seat frame, and an unlatching cam attached to the adjuster cam means for unitary rotation therewith and having first and second lobes located circumferentially past the plurality of discrete cam surfaces of the adjuster cam means and engageable with the latch lever to disengage the latch lever from the means on the seat frame to permit movement of the seat back to easy-enter position upon unitary rotation of the adjuster and unlatching cam means in either direction of rotation past the engagement of any of the discrete cam surfaces of the adjuster cam with the support arm.

3. In a vehicle seat including a seat back having laterally spaced support arms pivoted to the seat frame for pivotal movement of the seat back between use and easy-enter positions, the improvement comprising: first and second cam means pivotally mounted on the seat frame and connected for unitary rotation, a single operating handle for effecting rotation of the first and second cam means, the first cam means engaging one of the support arms to define the use angle of the seat back and having a plurality of cam surfaces of progressively increasing height to vary the use angle of the seat back upon rotation thereof by the operating handle, a latch lever pivotally mounted on one of the support arms and having an elongated recess therein, means on the seat frame engageable within the recess of the latch lever to lock the seat back from pivotal movement forwardly of the forwardmost use position defined by the first cam means, the second cam means being effective upon rotation of the first cam means past its range of seat back angle positioning to disengage the latch lever from the means on the seat frame to permit forward pivotal movement of the seat back to easy-enter position.

* * * * *